(12) United States Patent
Kakeno et al.

(10) Patent No.: US 10,497,995 B2
(45) Date of Patent: Dec. 3, 2019

(54) FUEL CELL SYSTEM AND CONTROL METHOD OF THE SAME

(71) Applicant: TOYOTA JIDOSHA KABUSHIKI KAISHA, Toyota-shi, Aichi-ken (JP)

(72) Inventors: Yuji Kakeno, Nisshin (JP); Kenji Umayahara, Miyoshi (JP); Takao Watanabe, Nagakute (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 36 days.

(21) Appl. No.: 15/625,294

(22) Filed: Jun. 16, 2017

(65) Prior Publication Data
US 2017/0365892 A1   Dec. 21, 2017

(30) Foreign Application Priority Data
Jun. 21, 2016   (JP) .................................. 2016-122194

(51) Int. Cl.
*H01M 10/63* (2014.01)
*H01M 8/10* (2016.01)
(Continued)

(52) U.S. Cl.
CPC ....... *H01M 10/63* (2015.04); *H01M 8/04302* (2016.02); *H01M 8/04373* (2013.01); *H01M 8/04656* (2013.01); *H01M 8/04888* (2013.01); *H01M 8/10* (2013.01); *H01M 10/05* (2013.01); *H01M 10/443* (2013.01); *H01M 10/486* (2013.01); *H01M 16/006* (2013.01)

(58) Field of Classification Search
CPC ............ H01M 10/63; H01M 8/04302; H01M 8/04373; H01M 8/04656; H01M 8/04888
See application file for complete search history.

(56) References Cited

U.S. PATENT DOCUMENTS

2003/0111977 A1   6/2003   Pearson
2007/0199747 A1   8/2007   Aoyagi et al.
(Continued)

FOREIGN PATENT DOCUMENTS

DE   11 2009 000 598 T5   2/2011
DE   11 2010 005 145 T5   10/2012
(Continued)

*Primary Examiner* — Ula C Ruddock
*Assistant Examiner* — Thomas H. Parsons
(74) *Attorney, Agent, or Firm* — Finnegan, Henderson, Farabow, Garrett & Dunner, LLP

(57) ABSTRACT

There is provided a fuel cell system. When receiving an instruction to start power generation of the fuel cell system, the fuel cell system is configured: (i) to obtain an output limit value of a secondary battery according to a predetermined relationship of a temperature of the secondary battery to the output limit value of the secondary battery by using the temperature of the secondary battery; (ii) to control a battery converter such as to increase a voltage of a smoothing capacitor for boosting included in the battery converter to a start-time target voltage that is higher than an open circuit voltage of a fuel cell, such that an output power of the secondary battery does not exceed the output limit value; and (iii) to operate the compressor such as to start supplying the cathode gas by the cathode gas supply system and to open the main stop valve such as to start supplying the anode gas by the anode gas supply system.

10 Claims, 5 Drawing Sheets

(51) Int. Cl.
*H01M 10/05* (2010.01)
*H01M 10/48* (2006.01)
*H01M 8/04858* (2016.01)
*H01M 10/44* (2006.01)
*H01M 16/00* (2006.01)
*H01M 8/0432* (2016.01)
*H01M 8/04537* (2016.01)
*H01M 8/04302* (2016.01)

(56) References Cited

U.S. PATENT DOCUMENTS

| | | |
|---|---|---|
| 2011/0018491 A1 | 1/2011 | Yoshida et al. |
| 2012/0013289 A1 | 1/2012 | Yoshida et al. |
| 2012/0070756 A1 | 3/2012 | Yoshida |
| 2012/0086278 A1 | 4/2012 | Kanie et al. |
| 2012/0274137 A1 | 11/2012 | Yoshida et al. |
| 2015/0380788 A1 | 12/2015 | Kazuno |
| 2016/0137097 A1 | 5/2016 | Kakeno et al. |

FOREIGN PATENT DOCUMENTS

| | | |
|---|---|---|
| DE | 11 2010 002 074 T5 | 1/2013 |
| JP | 2009-044953 | 2/2009 |
| JP | 2010-238532 | 10/2010 |
| JP | 2015-220961 | 12/2015 |
| JP | 2016-095911 | 5/2016 |

FUEL CELL SYSTEM AND CONTROL METHOD OF THE SAME

CROSS-REFERENCE TO RELATED APPLICATIONS

The present application claims priority from Japanese patent application 2016-122194 filed on Jun. 21, 2016, the content of which is hereby incorporated by reference into this application.

BACKGROUND

Field

The present disclosure relates to a fuel cell system and control method of the same.

Related Art

JP 2015-220961A describes a fuel cell system configured to include a fuel cell, an PC boost converter connected with the fuel cell, a secondary battery, a battery converter connected with the secondary battery, and an inverter connected with the PC boost converter and with the battery converter. The output of the inverter is connected with a driving motor for the vehicle and an air compressor to supply a cathode gas to the fuel cell. The battery converter is generally configured to include a smoothing capacitor on a boosting side (on an inverter side).

On the start of the fuel cell system, the air compressor are operated via the inverter to supply the cathode gas to the fuel cell in order to start power generation. At that time, the smoothing capacitor included in the battery converter is charged with electric power output from the secondary battery. In other words, on the start of the fuel cell system, the electric power output of the second battery is used to operate the air compressor and to charge the smoothing capacitor at the same time before the fuel cell starts power generation. The electric power output from the secondary battery exceeds an output limit value of the secondary battery because of charging the smoothing capacitor. This results in causing deterioration of the secondary battery. No sufficient measures however have been provided to suppress deterioration of the secondary battery on the start of the fuel cell system.

SUMMARY

In order to solve at least part the problems described above, the disclosure may be implemented by aspects described below.

(1) According to one aspect of the disclosure, there is provided a fuel cell system. The fuel cell system comprises: a fuel cell; an FC converter provided as a DC-DC converter and connected with the fuel cell at an input side thereof and with a main wiring on an output side thereof; a secondary battery; a battery converter provided as a DC-DC converter, connected between the secondary battery and the main wiring, and configured to include a smoothing capacitor for boosting on a main wiring side thereof; a battery sensor configured to measure a temperature of the secondary battery; a voltage sensor configured to measure a voltage of the smoothing capacitor; a cathode gas supply system configured to include a compressor that is operated with supply of electric power from the main wiring and to supply a cathode gas to the fuel cell; an anode gas supply system configured to include a main stop valve that is operated with supply of electric power from the secondary battery and to supply an anode gas to the fuel cell; and a controller. The controller, when receiving an instruction to start power generation of the fuel cell system, the controller is configured: (i) to obtain an output limit value of the secondary battery according to a predetermined relationship of the temperature of the secondary battery to the output limit value of the secondary battery by using the temperature of the secondary battery; (ii) to control the battery converter such as to increase the voltage of the smoothing capacitor to a start-time target voltage that is higher than an open circuit voltage of the fuel cell, such that an output power of the secondary battery does not exceed the output limit value; and (iii) to operate the compressor such as to start supplying the cathode gas by the cathode gas supply system and to open the main stop valve such as to start supplying the anode gas by the anode gas supply system.

The fuel cell system of this aspect is configured to control the battery converter such as to increase the voltage of the smoothing capacitor to the start-time target voltage that is higher than the open circuit voltage of the fuel cell, such that the output power of the secondary battery does not exceed the output limit value. After the voltage of the smoothing capacitor becomes equal to or higher than the start-time target voltage, the fuel cell system of this aspect is configured to start supplying the cathode gas and the anode gas. This configuration suppresses the output power of the secondary battery from exceeding the output limit value and thereby suppresses deterioration of the secondary battery.

(2) The fuel cell system according to the above aspect; the start-time target voltage may be a lower limit value of target voltage of the smoothing capacitor during ordinary operation of the fuel cell system.

The start-time target voltage is the lower limit value of target voltage of the smoothing capacitor during ordinary operation of the fuel cell system. The fuel cell system of this aspect is thus configured to start supplying the cathode gas and the anode gas to the fuel cell after the smoothing capacitor is sufficiently charged.

(3) The fuel cell system according to the above aspect; wherein the FC converter may be configured to include a smoothing capacitor for boosting on an output side thereof, and the controller may be configured to control the battery converter such that a voltage VC(t) of the smoothing capacitor for boosting included in the battery converter satisfies either one of equations given below:

$$VC(t) = \alpha \times [(2 \times W_{out} \times t)/(C1+C2) + V1^2]^{1/2}, \text{ and}$$

$$VC(t) = [(2 \times \alpha \times W_{out} \times t)/(C1+C2) + V1^2]^{1/2}$$

where Wout denotes the output limit value of the secondary battery; C1 denotes a capacitance of the smoothing capacitor for boosting included in the FC converter; C2 denotes a capacitance of the smoothing capacitor for boosting included in the battery converter; V1 denotes the voltage of the smoothing capacitor for boosting included in the battery converter before the battery converter is operated; α denotes a coefficient that is greater than 0 and is not greater than 1; and t denotes an elapsed time since a start of the battery converter.

The fuel cell system of this aspect is configured to control the battery converter such that the voltage VC(t) of the smoothing capacitor for boosting included in the battery converter satisfies the above equations. This configuration suppresses the output power of the secondary battery from exceeding the output limit value Wout.

(4) The fuel cell system according to the above aspect; wherein the start-time target voltage may be a predetermined voltage that is lower than a lower limit value of target voltage of the smoothing capacitor during ordinary operation of the fuel cell system.

The fuel cell system of this aspect is configured to start power generation of the fuel cell at the earlier timing, compared with the fuel cell system of the above aspect described in (2).

(5) The fuel cell system according to the above aspect; wherein the FC converter may be configured to include a smoothing capacitor for boosting on an output side thereof, and when Vtar2 denotes a start-time target voltage of the smoothing capacitor for boosting included in the battery converter, the controller may be configured to control the battery converter such that a voltage VC(t) of the smoothing capacitor for boosting included in the battery converter satisfies either one of equations given below until the voltage VC(t) reaches the start-time target voltage Vtar2:

$$VC(t)=\alpha \times [(2 \times Wout \times t)/(C1+C2)+V1^2]^{1/2}, \text{and}$$

$$VC(t)=[(2 \times \alpha \times Wout \times t)/(C1+C2)+V1^2]^{1/2},$$

and the controller is configured to control the battery converter such that the voltage VC(t) of the smoothing capacitor for boosting included in the battery converter satisfies any of equations given below after the voltage VC(t) reaches the start-time target voltage Vtar2:

$$VC(t)=\beta \times [(2 \times (Wout-Paux)(t-tx)/(C1+C2)+Vtar2^2]^{1/2},$$

$$VC(t)=[2 \times \beta \times (Wout-Paux)(t-tx)/(C1+C2)+Vtar2^2]^{1/2}, \text{and}$$

$$VC(t)=[2 \times (\beta \times Wout-Paux)(t-tx)/(C1+C2)+Vtar2^2]^{1/2}$$

where Wout denotes the output limit value of the secondary battery; C1 denotes a capacitance of the smoothing capacitor for boosting included in the FC converter; C2 denotes a capacitance of the smoothing capacitor for boosting included in the battery converter; V1 denotes the voltage of the smoothing capacitor for boosting included in the battery converter before the battery converter is operated; $\alpha$ and $\beta$ respectively denote coefficients that are greater than 0 and is not greater than 1; t denotes an elapsed time since a start of the battery converter; tx denotes an elapsed time until the voltage of the smoothing capacitor for boosting included in the battery converter reaches the start-time target voltage Vtar2 after the start of the battery converter; and Paux denotes power consumption during operations of the compressor and the main stop valve.

The fuel cell system of this aspect is configured to control the battery converter such that the voltage VC(t) of the smoothing capacitor for boosting included in the battery converter satisfies the above equations. This configuration suppresses the output power of the secondary battery from exceeding the output limit value Wout.

(6) The fuel cell system according to the above aspect; wherein the battery sensor may be configured to include an SOC arithmetic unit that is configured to calculate an SOC of the secondary battery, and the controller may be configured to obtain the output limit value of the secondary battery according to a predetermined relationship of the temperature and the SOC of the secondary battery to the output limit value of the secondary battery by using the temperature of the secondary battery and the calculated SOC.

The fuel cell system of this aspect is configured to obtain the output limit value of the secondary battery with higher accuracy.

The present disclosure may be implemented by various aspects other than the fuel cell system, for example, a control method of the fuel cell system, a vehicle equipped with the fuel cell system and a moving body equipped with the fuel cell system.

DESCRIPTION OF EMBODIMENTS

[First Embodiment]

Figure 1:
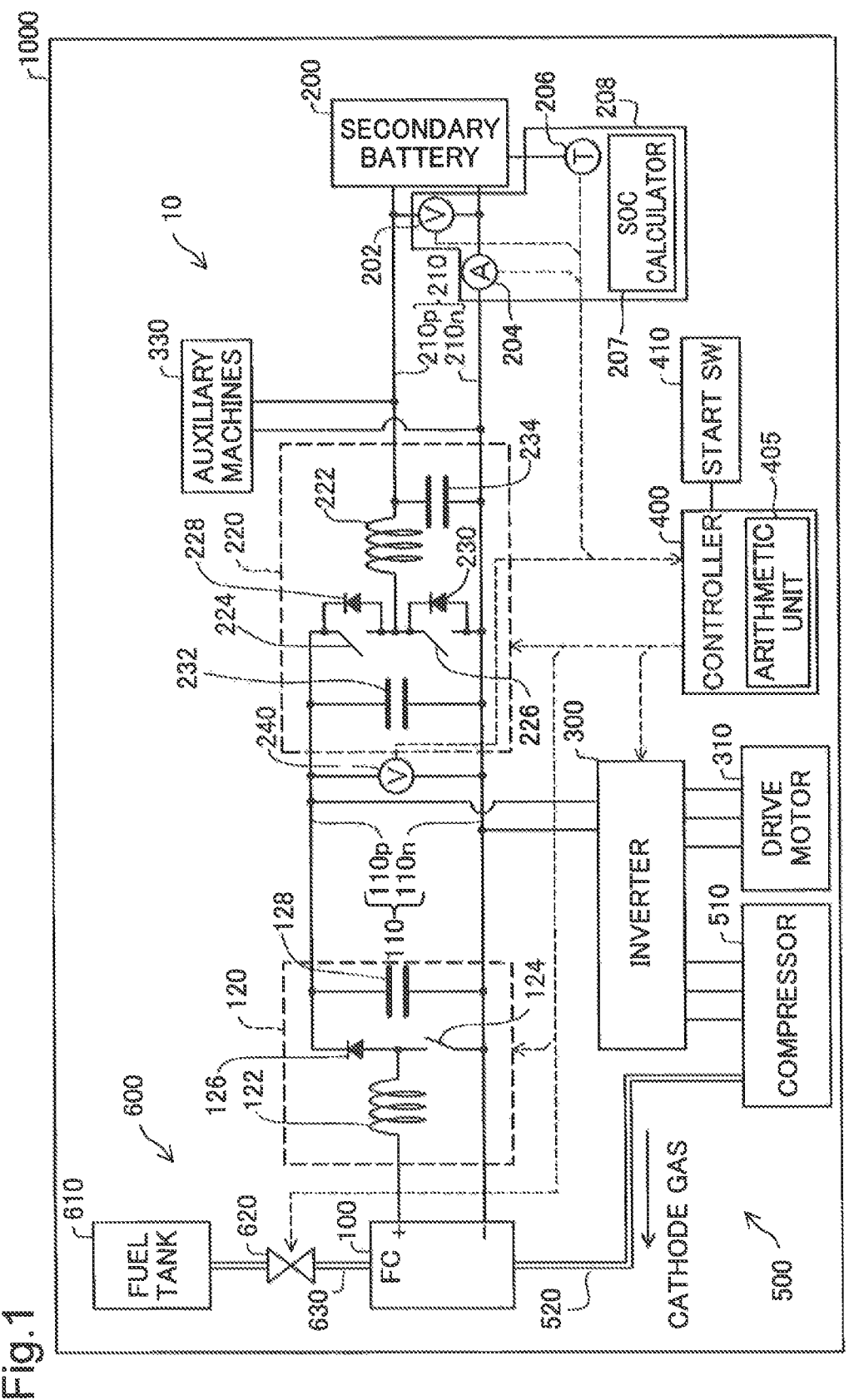
FIG. 1 is a diagram illustrating the schematic configuration of a fuel cell system according to a first embodiment.

FIG. 1 is a diagram illustrating the schematic configuration of a fuel cell system 10 according to a first embodiment. This fuel cell system 10 is mounted on a moving body such as a vehicle 1000. This fuel cell system 10 may be configured to include a fuel cell 100 (expressed as "FC" in the drawings), first high voltage wirings 110, an FC converter 120, a battery converter 220, second high voltage wirings 210, a secondary battery 200, an inverter 300, a drive motor 310, auxiliary machines 330, a controller 400, a start switch 410 (expressed as "start SW" in the drawings), a cathode supply system 500 including a compressor 510, and an anode gas supply system 600 including a fuel tank 610. The first high voltage wirings 110 are also called "main wirings".

The fuel cell 100 is a power generation device configured to generate electric power by a reaction of an anode gas and a cathode gas. An input side of the FC converter 120 is connected with the fuel cell 100. An output side of the FC converter 120 is connected with a high voltage side of the battery converter 220 by the first high voltage wirings 110. A low voltage side of the battery converter 220 is connected with the secondary battery 200 by the second high voltage wirings 210.

The FC converter 120 is a DC-DC converter configured to include a reactor 122 (also called "coil 122"), a switch 124, a diode 126 and a first smoothing capacitor 128 for boosting. The diode 126 and the switch 124 are connected in series between a positive-side first high voltage wiring 110p and a negative-side first high voltage wiring 110n. The reactor 122 has one terminal that is connected with a positive electrode of the fuel cell 100 and the other terminal that is connected between the diode 126 and the switch 124. The first smoothing capacitor 128 is arranged in parallel with the diode 126 and the switch 124 to be placed between the positive-side first high voltage wiring 110p and the negative-side first high voltage wiring 110n, in other words, the first smoothing capacitor 128 is connected with the output side of the FC converter 120 (i.e., that is opposite to the fuel cell 100).

The battery converter 220 is a bidirectional DC-DC converter configured to include a reactor 222 (also called "coil 222"), two switches 224 and 226, two diodes 228 and 230 and two (second and third) smoothing capacitors 232 and 234. The two switches 224 and 226 are connected in series between the positive-side first high voltage wiring 110p and the negative-side first high voltage wiring 110n.

The diode 228 is connected in parallel with the switch 224, and the diode 230 is connected in parallel with the switch 226. The second smoothing capacitor 232 is connected with the positive-side first high voltage wiring 110p and with the negative-side first high voltage wiring 110n. The first high voltage wirings 110 (main wirings) serve as wirings on the high voltage side of the battery converter 220. The second smoothing capacitor 232 is a smoothing capacitor for boosting that is connected with the high voltage side of the battery converter 220. The reactor 222 has one terminal that is connected between the two switches 224 and 226 and the other terminal that is connected with a positive-side second high voltage wiring 210p. The third smoothing capacitor 234 is connected with the positive-side second high voltage wiring 210p and with a negative-side second high voltage wiring 210n. The third smoothing capacitor 234 is a smoothing capacitor for stepping down that is connected with the low voltage side of the battery converter 220. A voltage sensor 240 is provided on the high voltage side of the battery converter 220 to measure a voltage of the second smoothing capacitor 232.

The secondary battery 200 may be configured by, for example, a nickel metal hydride battery or a lithium ion rechargeable battery. The secondary battery 200 is equipped with a battery sensor 208 that includes a voltage sensor 202 configured to measure a voltage of the secondary battery 200, a current sensor 204 configured to measure an electric current of the secondary battery 200 and a temperature sensor 206 configured to measure a temperature of the secondary battery 200. According to a preferable configuration, the battery sensor 208 further includes an SOC calculator 207 configured to calculate an SOC (state of charge) of the secondary battery 200. The voltage of the secondary battery 200 may be 200 V to 400 V, is preferably 240V to 350 V, and is more preferably 260 V to 300 V. A voltage of the second high voltage wirings 210 during ordinary operation of the fuel cell system 10 (i.e., a voltage of the positive-side second high voltage wiring 210p relative to the negative-side second high voltage wiring 210n) is approximately equal to the voltage of the secondary battery 200. A voltage VC (target voltage) of the second smoothing capacitor 232 during ordinary operation is approximately equal to a voltage of the first high voltage wirings 110 (i.e., a voltage of the positive-side first high voltage wiring 110p relative to the negative-side first high voltage wiring 110n) and may be 400 V to 700 V, is preferably 500V to 680 V and is more preferably 600 V to 650 V. For example, when the target voltage of the second smoothing capacitor 232 during ordinary operation is in a range of 600 V to 650 V, a lower limit value of the target voltage is 600 V.

The inverter 300 is connected with the first high voltage wirings 110. The inverter 300 is configured to convert a DC power into, for example, a three-phase AC power and supply the converted power to the drive motor 310 and to the compressor 510 (or more specifically to a motor provided to operate the compressor 510). The drive motor 310 is a motor configured to drive wheels (not shown) of the moving body The compressor 510 is a device configured to supply the cathode gas to the fuel cell 100. According to a modification, the drive motor 310 and the compressor 510 may be provided as the DC drive type, and the inverter 300 may be omitted. In this modification, the drive motor 310 and the compressor 510 are operated with supply of electric power from the first high voltage wirings 110, like the configuration of FIG. 1.

The auxiliary machines 330 include devices other than the compressor 510 provided to operate the fuel cell 100, for example, a hydrogen pump, a cooling liquid pump and a DC-DC converter for stepping down (not shown individually). Among the auxiliary machines 300, the auxiliary machines other than the DC-DC converter may be connected with low voltage wirings (not shown) on a step-down side of the DC-DC converter. The low voltage wirings may be set to have a voltage of, for example, 12 V to 14 V.

The cathode gas supply system 500 may include the compressor 510 and a cathode gas piping 520 and is configured to supply the air as the cathode gas to the fuel cell 100. The anode gas supply system 600 may include the fuel tank 610, a main stop valve 620 and an anode gas piping 630. The fuel tank 610 is configured to store the anode gas used for the fuel cell 100. The main stop valve 620 is an electromagnetic valve operated with supply of electric power from the secondary battery 200 or a lower voltage secondary battery (not shown) and is configured to connect and disconnect the supply of the anode gas from the fuel tank 610. A pressure regulator configured to regulate a supply amount of the anode gas to the fuel cell 100 and an injector configured to inject the anode gas to the fuel cell 100 are provided between the main stop valve 620 and the fuel cell 100, although not being specifically illustrated.

The controller 400 is configured to control the operations of the fuel cell system 10. The controller 400 includes an arithmetic unit 406 configured to calculate or obtain an output limit value of the secondary battery 200 and a voltage, command value for boosting control of the battery converter 220. The controller 400 and the arithmetic unit 405 may be configured as an integral unit or may be configured as separate units. The controller 400 may be provided independently or may be incorporated as part of another control device, for example, as part of a control device of the moving body. According to the embodiment, the controller 400 is configured to perform various controls. According to a modification, a controller configured to control the battery converter 220 and the inverter 300 and a controller configured to control the auxiliary machines 330 may be provided as separate controllers. The start switch 410 is a switch configured to start and stop the fuel cell system 10.

Figure 2:
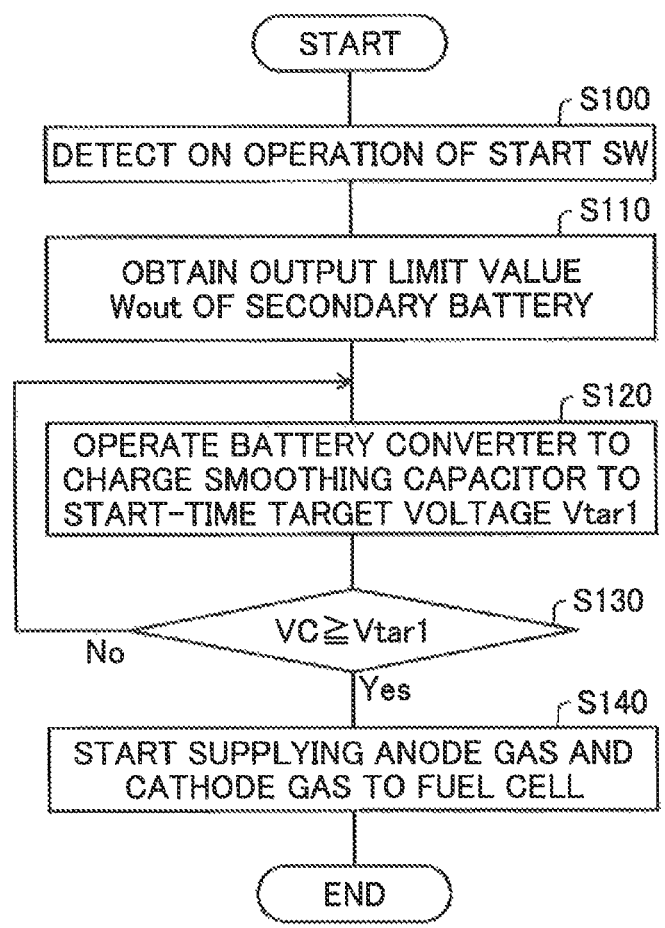
FIG. 2 is a flowchart of control performed at the start of the fuel cell system according to the first embodiment.

FIG. 2 is a flowchart of control performed at the start of the fuel cell system 10 according to the first embodiment. When the controller 400 detects an ON operation of the start switch 410 to provide an instruction for starting power generation of the fuel cell system 10 at step S100, the controller 400 proceeds to step S110 to obtain an output limit value Wout of the secondary battery 200. The output limit value Wout of the secondary battery 200 indicates a maximum electric power that is suppliable from the secondary battery 200 while suppressing deterioration of the secondary battery 200 and depends on the SOC and the temperature of the secondary battery 200. The SOC is an index indicating the charge level of the secondary battery 200: 0% indicates the state that the secondary battery 200 is not charged at all and 100% indicates the state that the secondary battery 200 is fully charged. In general, the output limit value Wout provides a larger value at the higher SOC of the secondary battery 200 and provides a smaller value at the lower SOC of the secondary battery 200. As long as the SOC of the secondary battery 200 is a value in a range of ordinary operation of the secondary battery 200, the SOC does not significantly affect the output limit value Wout, and the output limit value Wout depends on substantially only the temperature. The output limit value Wout tends to decrease with a decrease in the temperature of the secondary battery 200. A lithium ion rechargeable battery that may be used for the secondary battery 200 has a larger decrease rate of the output limit value Wout with a decrease in the temperature, compared with other secondary batteries, for example, a nickel metal hydride battery. When the lithium ion rechargeable battery is used for the secondary battery 200, there is thus especially a high demand for suppressing a large electric power from being output from the secondary battery 200 at the start of the fuel cell system 10 at low temperature. When any battery other than the lithium ion rechargeable battery is used for the secondary battery 200, keeping the output limit value Wout suppresses deterioration of the battery As described above, the output limit value Wout of the secondary battery 200 depends on substantially only the temperature. The output limit value Wout may thus be determined using only the temperature of the secondary battery 200. Using both the temperature and the SOC of the secondary battery 200, however, provides the more accurate output limit value Wout. The arithmetic unit 405 may be configured to store a relationship between the temperature (and the SOC) of the secondary battery 200 and the output limit value Wout experimentally or otherwise determined in advance in the form of a map or a lookup table and obtain the output limit value Wout using this relationship.

At step S120 the controller 400 operates the battery converter 220 to charge the second smoothing capacitor 232 (and the first smoothing capacitor 128) to a start-time target voltage Vtar1. The controller 400 causes the arithmetic unit 405 to compute a time change in the voltage of the second smoothing capacitor 232 such as not to exceed the output limit value Wout of the secondary battery 200, and controls the operation of the battery converter 220.

The arithmetic unit 405 computes a time change in the voltage of the second smoothing capacitor 232 as described below. In the following description, V1 denotes a voltage VC of the second smoothing capacitor 232 immediately before the start of the operation of the battery converter 220, Vtar1 denotes the start-time target voltage of the second smoothing capacitor 232, C2 denotes a capacitance of the second smoothing capacitor 232, C1 denotes a capacitance of the first smoothing capacitor 128, and Wout denotes the output limit value of the secondary battery 200. The start-time target voltage Vtar1 of the second smoothing capacitor 232 is a predetermined voltage that is higher than an open circuit voltage (OCV) of the fuel cell 100. The "open circuit voltage of the fuel cell 100" means an open circuit voltage during ordinary operation of the fuel cell 100 and more specifically denotes an open circuit voltage when sufficient amounts of the cathode gas and the anode gas are supplied to the fuel cell 100. According to the first embodiment, the start-time target voltage Vtar1 is set to a lower limit value of target voltage of the second smoothing capacitor 232 during ordinary operation. An energy Eup required to increase the voltage VC of the second smoothing capacitor 232 from the voltage V1 immediately before the start of the operation of the battery converter 220 to the start-time target voltage Vtar1 is shown by Equation (1) given below:

$$Eup=(C1+C2)(Vtar1^2-V1^2)/2 \quad (1)$$

Equation (1) includes the capacitance C1 of the first smoothing capacitor 128, since the FC converter 120 is connected with the battery converter 220 and the first smoothing capacitor 128 and the second smoothing capacitor 232 are connected in parallel with each other in the configuration of the first embodiment.

On the assumption that the electric power output from the secondary battery 200 is equal to the output limit value Wout, Equation (2) given below holds:

$$Eup=Wout \times Tup \quad (2)$$

In Equation (2), Tup denotes a time period required to increase the voltage VC of the second smoothing capacitor 232 from the current voltage V1 to the start-time target voltage Vtar1.

Equation (3) is led from Equation (1) and Equation (2):

$$Wout \times Tup=(C1+C2)(Vtar1^2-V1^2)/2 \quad (3)$$

Equation (4) is led when a voltage of the second smoothing capacitor 232 at an elapsed time t since the start of the battery converter 220 is expressed as VC(t) in Equation (3). Equation (5) is led by solving Equation (4) with regard to the voltage VC(t) of the second smoothing capacitor 232:

$$Wout \times t=(C1+C2)(VC(t)^2-V1^2)/2 \quad (4)$$

$$VC(t)=[(2 \times Wout \times t)/(C1+C2)+V1^2]^{1/2} \quad (5)$$

The controller 400 performs feedback control of the voltage on the output side (high voltage side) of the battery converter 220 such that a change in the voltage VC of the second smoothing capacitor 232 satisfies either Equation (6) or Equation (7) given below:

$$VC(t)=\alpha \times [(2 \times Wout \times t)/(C1+C2)+V1^2]^{1/2} \quad (6)$$

$$VC(t)=[(2 \times \alpha \times Wout \times t)/(C1+C2)+V1^2]^{1/2} \quad (7)$$

In Equations (6) and (7), a coefficient α is a value that is greater than 0 and is not greater than 1 and may be a value, for example, in a range of 0.8 to 0.95.

At step S130, the controller 400 determines whether the voltage VC of the second smoothing capacitor 232 becomes equal to or higher than the start-time target voltage Vtar1. When VC≥Vtar1 is not satisfied, the controller 400 returns to step S120. When VC≥Vtar1 is satisfied, on the other hand, the controller 400 proceeds to step S140 to operate the compressor 510 using the inverter 300 such as to start supplying the cathode gas to the fuel cell 100 and open the main stop valve 620 such as to start supplying the anode gas to the fuel cell 100. This makes the fuel cell 100 ready for power generation. It is, however, preferable to keep the FC converter 120 in a non-operated state for some time. At this moment, the voltage VC of the second smoothing capacitor 232 is higher than the open circuit voltage of the fuel cell 100. Even when the fuel cell 100 is ready for power generation, no electric current thus flows from the fuel cell 100 to the second smoothing capacitor 232 unless the FC converter 120 is operated. This configuration prevents the fuel cell 100 from outputting an electric power with a small supply of the anode gas and is thus unlikely to cause degradation of the catalyst of the fuel cell 100. The controller 400 shifts to control of the ordinary operation of the fuel cell system 10 on subsequent satisfaction of a predetermined condition (for example, condition that the flow rates of the anode gas and the cathode gas reach predetermined sufficient levels).

Figure 3:
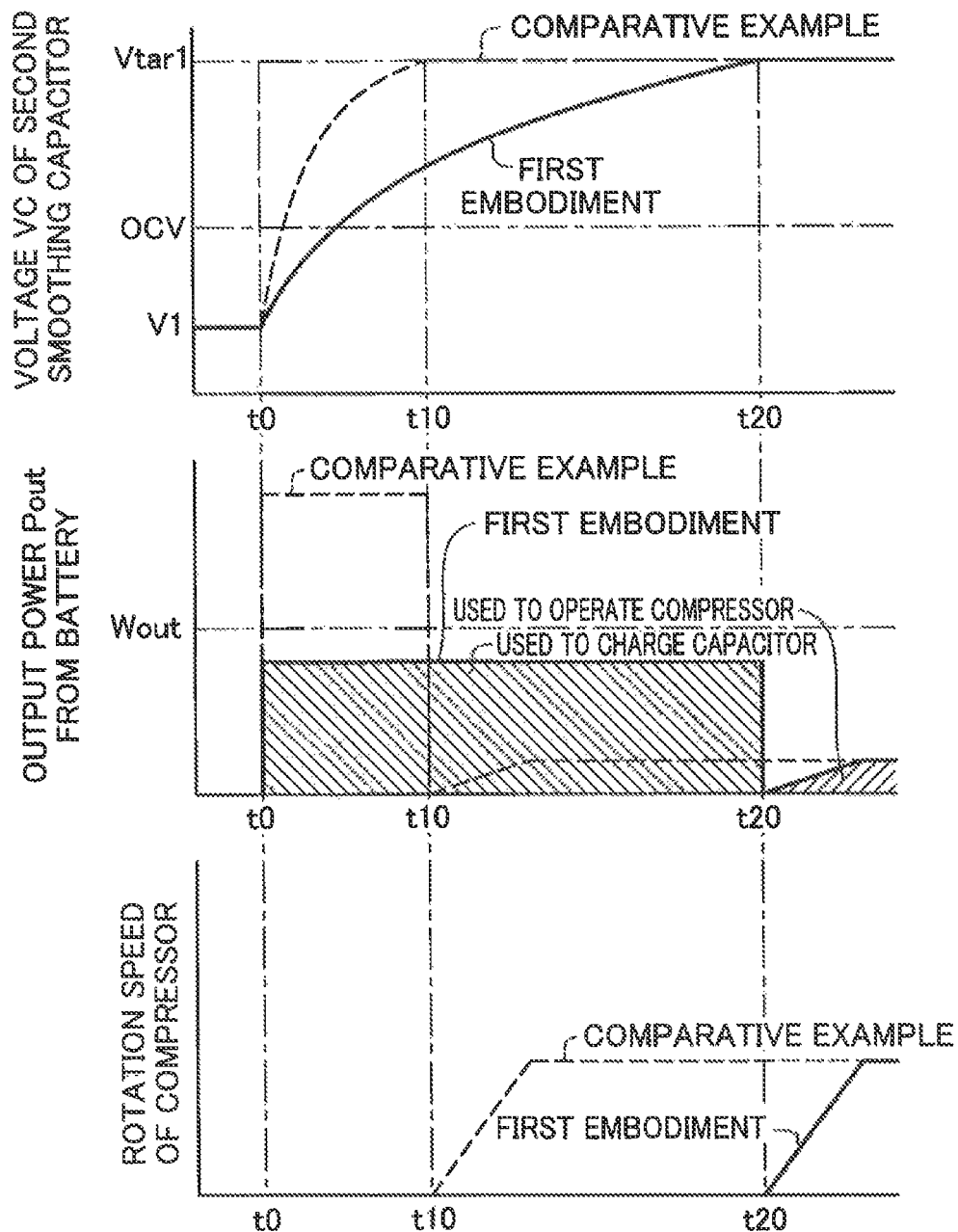
FIG. 3 is graphs showing changes in voltage of the second smoothing capacitor, output power Pout from the secondary battery and rotation speed of the compressor.

FIG. 3 is graphs showing changes in voltage VC of the second smoothing capacitor 232, output power Pout from the secondary battery 200 and rotation speed of the compressor 510. A comparative example is an example in which the voltage command value for boosting control of the battery converter 220 is fixed to the start-time target voltage Vtar1 and there is no output limit from the secondary battery 200.

In both the comparative example and the first embodiment, the controller 400 starts the operation of the battery converter 220 at a time t0. In the comparative example, at a time t10, the voltage VC of the second smoothing capacitor 232 reaches the start-time target voltage Vtar1, and the controller 400 controls the fuel cell 100 to start power generation. The output power Pout from the secondary battery 200 for a time period from the time t0 to the time t10, however, exceeds the output limit value Wout. This is likely to cause deterioration of the secondary battery 200.

In the first embodiment, on the other hand, the output power Pout of the secondary battery 200 is regulated to be not higher than the output limit value Wout. After the voltage VC of the second smoothing capacitor 232 reaches the start-time target voltage Vtar1 at a time t20, the controller 400 controls the fuel cell 100 to start power generation. According to the first embodiment, the output power Pout of the secondary battery 200 is regulated to be not higher than the output limit value Wout for a time period from the time t0 to the time t20. This configuration suppresses deterioration of the secondary battery 200. Additionally, the fuel cell 100 starts power generation after the voltage VC of the second smoothing capacitor 232 reaches the start-time target voltage Vtar1. This suppresses degradation of the catalyst of the fuel cell 100.

As described above, according to the first embodiment, the controller 400 controls the battery converter 220 to increase the voltage VC of the second smoothing capacitor 232 to the start-time target voltage Vtar1, while regulating the output power Pout from the secondary battery 200 to be not higher than the output limit value Wout. After the voltage VC of the second smoothing capacitor 232 reaches the start-time target value Vtar1, the controller 400 starts supplying the anode gas and the cathode gas to the fuel cell 100. This configuration suppresses degradation of the catalyst of the fuel cell 100 and suppresses deterioration of the secondary battery 200.

[Second Embodiment]

Figure 4:
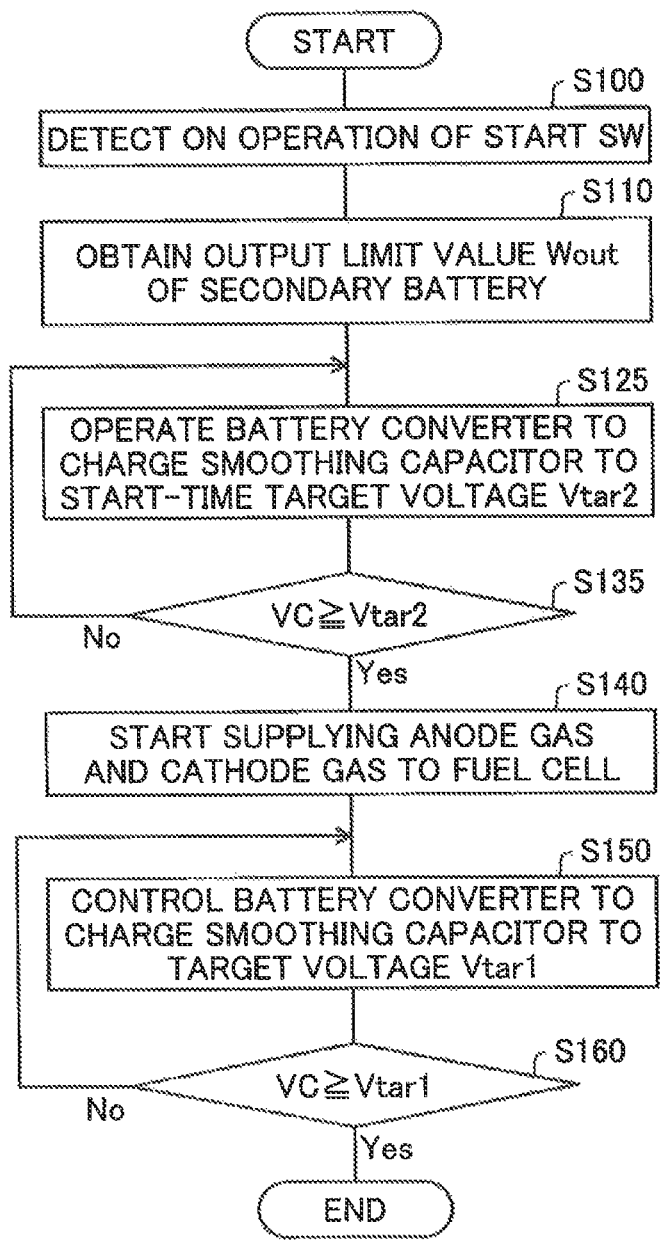
FIG. 4 is a flowchart of control performed at the start of a fuel cell system according to a second embodiment.

FIG. 4 is a flowchart of control performed at the start of a fuel cell system 10 according to a second embodiment. The fuel cell system 10 of the second embodiment has the schematic configuration that is identical with that of the fuel cell system 10 of the first embodiment shown in FIG. 1. The flowchart of the control performed at the start of the fuel cell system 10 of the second embodiment shown in FIG. 4 is similar to the flowchart of the control shown in FIG. 2, except that steps S120 and S130 are replaced with steps S125 and S135 and that steps S150 and S160 are added after step S140. The following mainly describes such differences.

At step S125, the controller 400 operates the battery converter 220 to charge the second smoothing capacitor 232 (and the first smoothing capacitor 128) to a start-time target voltage Vtar2. This start-time target voltage Vtar2 is a voltage that is higher than the open circuit voltage (OCV) of the fuel cell 100 and is lower than the start-time target voltage Vtar1 used in the first embodiment (i.e., the lower limit value of target voltage of the second smoothing capacitor 232 during ordinary operation of the fuel cell system 10). It is preferable that the controller 400 performs feedback control to satisfy Equation (6) or Equation (7) until the voltage VC of the second smoothing capacitor 232 reaches the start-time target voltage Vtar2:

$$VC(t) = \alpha \times [(2 \times W\text{out} \times t)/(C1+C2) + V1^2]^{1/2} \qquad (6)$$

$$VC(t) = [(2 \times \alpha \times W\text{out} \times t)/(C1+C2) + V1^2]^{1/2} \qquad (7)$$

At step S135, the controller 400 determines whether the voltage VC of the second smoothing capacitor 232 becomes equal to or higher than the start-time target voltage Vtar2. After the voltage VC of the second smoothing capacitor 232 reaches this start-time target voltage Vtar2, even when the fuel cell 100 is ready for power generation, no electric current flows from the fuel cell 100 to the second smoothing capacitor 232 unless the FC converter 120 is operated. This configuration accordingly suppresses degradation of the catalyst of the fuel cell 100. When the voltage VC of the second smoothing capacitor 232 becomes equal to or higher than the start-time target voltage Vtar2 at step S135, the controller 400 proceeds to step S140. When the voltage VC of the second smoothing capacitor 232 does not become equal to or higher than the start-time target voltage Vtar2 at step S135, on the other hand, the controller 400 returns to step S125 and repeats the processing of steps S125 and 135 until the voltage of the second smoothing capacitor 232 becomes equal to or higher than the start-tithe target voltage Vtar2.

At step S140, like the first embodiment, the controller 400 operates the compressor 510 using the inverter 300 such as to start supplying the cathode gas to the fuel cell 100 and opens the main stop valve 620 such as to start supplying the anode gas to the fuel cell 100. This enables the fuel cell 100 to start power generation. Like the first embodiment, it is preferable to keep the Fe converter 120 in a non-operated state for some time and start the operation of the FC converter 120 after the flow rates of the anode gas and the cathode gas reach predetermined sufficient levels.

At step S150, the controller 400 controls the battery converter 220 to charge the second smoothing capacitor 232 (and the first smoothing capacitor 128) to a target Voltage Vtar1 (i.e., a lower limit value of target voltage during ordinary operation). In this state, part of the output power of the secondary battery 200 is consumed for the operation of the compressor 510 using the inverter 300 and the opening operation of the main stop valve 620. When the power consumption for the operation of the compressor 510 and the operation of the main stop valve 620 is expressed as Paux, the controller 400 performs feedback control of the voltage on the output side (high voltage side) of the battery converter 220, such as to satisfy any of Equations (8) to (10) given below at step S150:

$$VC(t) = \beta \times [(2 \times (W\text{out} - P\text{aux})(t-tx)/(C1+C2) + V\text{tar}2^2]^{1/2} \qquad (8)$$

$$VC(t) = [2 \times \beta \times (W\text{out} - P\text{aux})(t-tx)/(C1+C2) + V\text{tar}2^2]^{1/2} \qquad (9)$$

$$VC(t) = [2 \times (\beta \times W\text{out} - P\text{aux})(t-tx)/(C1+C2) + V\text{tar}2^2]^{1/2} \qquad (10)$$

In Equations (8) to (10), tx denotes an elapsed time until the voltage VC of the second smoothing capacitor 232 reaches the start-time target voltage Vtar2 after the start of the operation of the battery converter 220, and a coefficient β is a value that is greater than 0 and is not greater than 1 and may be a value, for example, in a range of 0.8 to 0.95. The coefficients α and β may be the same values. The opening operation of the main stop valve 620 is only momentary. The power consumption Paux is thus approximately equal to the sum of the power consumption of the inverter 300 and the power consumption of the compressor 510.

At step S160, the controller 400 determines whether the voltage VC of the second smoothing capacitor 232 becomes equal to or higher than the target voltage Vtar1. When VC≥Vtar1 is satisfied, the controller 400 shifts to ordinary control.

Figure 5:
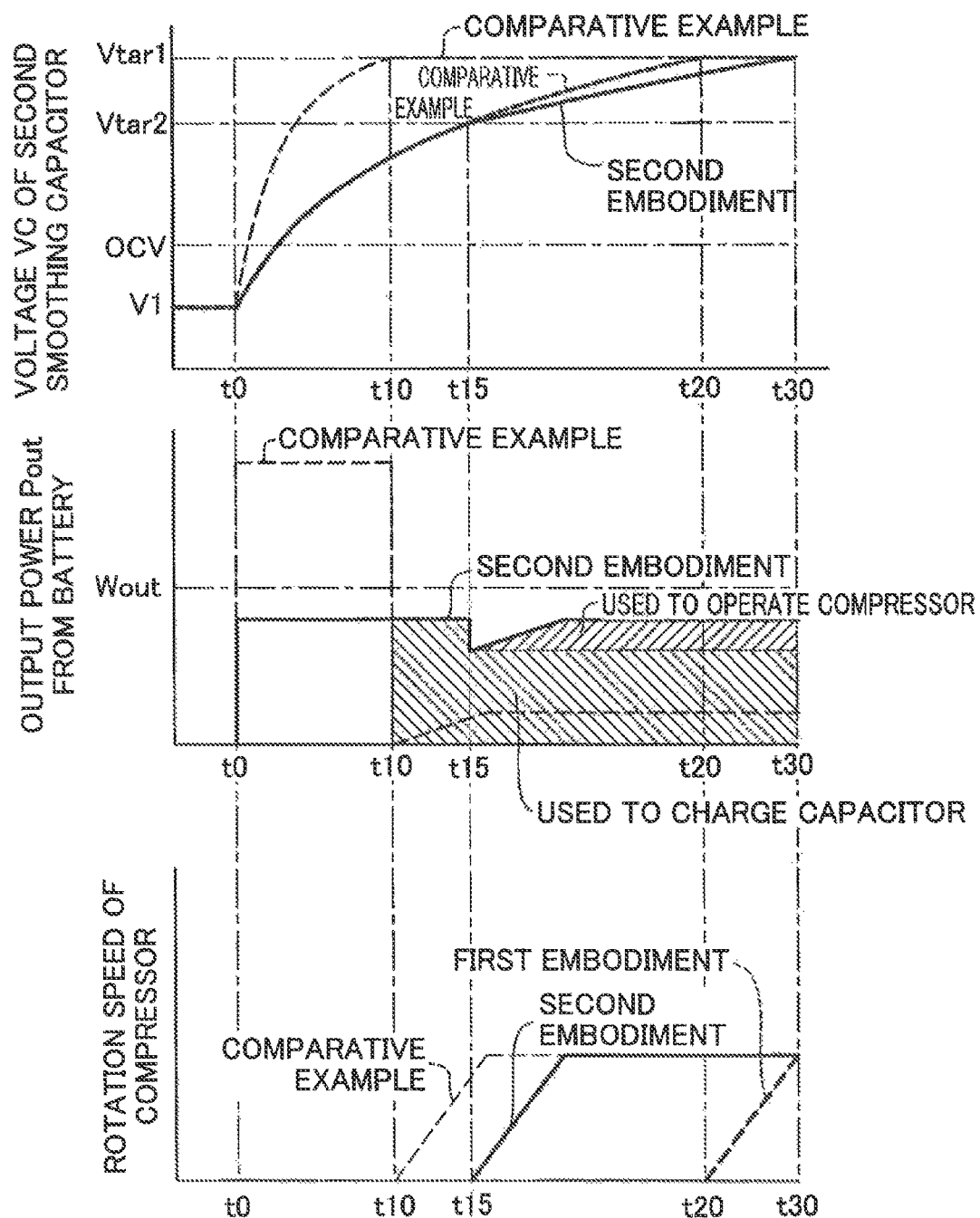
FIG. 5 is graphs showing changes in voltage of the second smoothing capacitor, output power Pout from the secondary battery and rotation speed of the compressor according to the second embodiment.

FIG. 5 is graphs showing changes in voltage VC of the second smoothing capacitor 232, output power Pout from the secondary battery 200 and rotation speed of the compressor 510 according to the second embodiment. In the second embodiment, the voltage VC of the second smoothing capacitor 232 reaches the start-time target voltage Vtar2 at a time t15 that is earlier than the time t20 at which the voltage VC of the second smoothing capacitor 232 reaches the target voltage Vtar1 in the first embodiment. After the voltage VC of the second smoothing capacitor 232 reaches the start-time target voltage Vtar2, even when the fuel cell 100 is ready for power generation, no electric current flows from the fuel cell 100 to the second smoothing capacitor 232 unless the FC converter 120 is operated. The controller 400 starts supplying the cathode gas and the anode gas to the fuel cell 100 at the time t15. After that, part of the output power of the secondary battery 200 is used to operate the inverter 300 and the compressor 510, while a remaining part is used to charge the second smoothing capacitor 232. This configuration accordingly starts supplying the cathode gas and the anode gas to the fuel cell 100 and makes the fuel cell 100 ready for power generation at the earlier timing than that of the first embodiment. This shortens the time period before the start of power generation of the fuel cell 100.

According to the second embodiment, the controller 400 starts supplying the cathode gas and the anode gas to the fuel cell 100 after the voltage VC of the second smoothing capacitor 232 reaches the start-time target voltage Vtar2. This configuration shortens the time period before the start of power generation of the fuel cell 100, compared with the first embodiment. In this state, the voltage VC of the second smoothing capacitor 232 is higher than the open circuit voltage (OCV) of the fuel cell 100. This configuration accordingly suppresses degradation of the catalyst of the fuel cell 100.

[Modification 1]

According to the above embodiments, the FC converter 120, the battery converter 220 and the inverter 300 are directly connected with one another by the first high voltage wirings 110. According to a modification, a relay (also called "FC relay") may be provided in the first high voltage wirings 110 to be placed between the FC converter 120 and the battery converter 220 along with the inverter 300. This FC relay is set in an open position during stop of the fuel cell system 10. According to a preferable configuration, when receiving a start instruction of the fuel cell system 10 at step S100 in FIG. 2 or FIG. 4, the controller 400 sets the FC relay to a closed position and subsequently proceeds to step S110. When the FC relay is connected after charging of the second smoothing capacitor 232 with electric power, a high electric current is likely to flow from the second smoothing capacitor 232 through the FC relay to the first smoothing capacitor 128 according to the charge level of the second smoothing capacitor 232. In order to avoid the flow of such high electric current, it is preferable to perform the processing of step S110 after setting the FC relay to the closed position.

The foregoing describes some aspects of the disclosure with reference to some embodiments and modifications. The embodiments and the modifications described above are only illustrative for the purpose of better understanding of the disclosure and are not intended to limit the present disclosure in any sense. These embodiments and modifications may be changed, altered or modified without departing from the scope of the disclosure. The present disclosure includes equivalents thereof, as well as such changes, alterations and modifications.

What is claimed is:

1. A fuel cell system, comprising:
    a fuel cell;
    an FC converter connected with the fuel cell at an input side thereof and with a main wiring on an output side thereof;
    a secondary battery;
    a battery converter connected between the secondary battery and the main wiring, and configured to include a smoothing capacitor for boosting on a main wiring side thereof;
    a battery sensor configured to measure a temperature of the secondary battery;
    a voltage sensor configured to measure a voltage of the smoothing capacitor;
    a cathode gas supply system configured to include a compressor that is operated with supply of electric power from the main wiring and to supply a cathode gas to the fuel cell;
    an anode gas supply system configured to include a main stop valve that is operated with supply of electric power from the secondary battery and to supply an anode gas to the fuel cell; and
    a controller, wherein
    when receiving an instruction to start power generation of the fuel cell system, the controller is programmed:
    (i) to obtain an output limit value of the secondary battery according to a predetermined relationship of the temperature of the secondary battery to the output limit value of the secondary battery by using the temperature of the secondary battery;
    (ii) to control the battery converter such as to increase the voltage of the smoothing capacitor to a start-time target voltage that is higher than an open circuit voltage of the fuel cell, such that an output power of the secondary battery does not exceed the output limit value; and
    (iii) after the voltage of the smoothing capacitor becomes equal to or higher than the start-time target voltage, to operate the compressor such as to start supplying the cathode gas by the cathode gas supply system and to open the main stop valve such as to start supplying the anode gas by the anode gas supply system.

2. The fuel cell system according to claim 1, wherein the start-time target voltage is a lower limit value of target voltage of the smoothing capacitor during ordinary operation of the fuel cell system.

3. The fuel cell system according to claim 2, wherein the FC converter is configured to include a smoothing capacitor for boosting on an output side thereof, and
    the controller is configured to control the battery converter such that a voltage VC(t) of the smoothing capacitor for boosting included in the battery converter satisfies either one of equations given below:

$$VC(t)=\alpha\times[(2\times W_{out}\times t)/(C1+C2)+V1^2]^{1/2}, \text{ and}$$

$$VC(t)=[(2\times\alpha\times W_{out}\times t)/(C1+C2)+V1^2]^{1/2}$$

where Wout denotes the output limit value of the secondary battery; C1 denotes a capacitance of the smoothing capacitor for boosting included in the FC converter; C2 denotes a capacitance of the smoothing capacitor for boosting included in the battery converter; V1 denotes the voltage of the smoothing capacitor for boosting included in the battery converter before the battery converter is operated; α denotes a coefficient that is greater than 0 and is not greater than 1; and t denotes an elapsed time since a start of the battery converter.

4. The fuel cell system according to claim 3, wherein the battery sensor has a function of calculating an SOC (State of Charge) of the secondary battery by measuring a voltage and a current of the secondary battery in addition to the function of measuring the temperature of the secondary battery, and the controller is configured to obtain the output limit value of the secondary battery according to a predetermined relationship of the temperature and the SOC of the secondary battery to the output limit value of the secondary battery by using the temperature of the secondary battery and the calculated SOC.

5. The fuel cell system according to claim 2, wherein the battery sensor has a function of calculating an SOC (State of Charge) of the secondary battery by measuring a voltage and a current of the secondary battery in addition to the function of measuring the temperature of the secondary battery, and the controller is configured to obtain the output limit value of the secondary battery according to a predetermined relationship of the temperature and the SOC of the secondary battery to the output limit value of the secondary battery by using the temperature of the secondary battery and the calculated SOC.

6. The fuel cell system according to claim 1, wherein the start-time target voltage is a predetermined voltage that is lower than a lower limit value of target voltage of the smoothing capacitor during ordinary operation of the fuel cell system.

7. The fuel cell system according to claim 6, wherein the FC converter is configured to include a smoothing capacitor for boosting on an output side thereof, and when Vtar2 denotes a start-time target voltage of the smoothing capacitor for boosting included in the battery converter, the controller is configured to control the battery converter such that a voltage VC(t) of the smoothing capacitor for boosting included in the battery converter satisfies either one of equations given below until the voltage VC(t) reaches the start-time target voltage Vtar2:

$$VC(t)=\alpha \times [(2 \times Wout \times t)/(C1+C2) + V1^2]^{1/2}, \text{ and}$$

$$VC(t)=[(2 \times \alpha \times Wout \times t)/(C1+C2) + V1^2]^{1/2},$$

and the controller is configured to control the battery converter such that the voltage VC(t) of the smoothing capacitor for boosting included in the battery converter satisfies any of equations given below after the voltage VC(t) reaches the start-time target voltage Vtar2:

$$VC(t)=\beta \times [(2 \times (Wout-Paux)(t-tx)/(C1+C2) + Vtar2^2]^{1/2},$$

$$VC(t)=[2 \times \beta \times (Wout-Paux)(t-tx)/(C1+C2) + Vtar2^2]^{1/2}, \text{ and}$$

$$VC(t)=[2 \times (\beta \times Wout-Paux)(t-tx)/(C1+C2) + Vtar2^2]^{1/2}$$

where Wout denotes the output limit value of the secondary battery; C1 denotes a capacitance of the smoothing capacitor for boosting included in the FC converter; C2 denotes a capacitance of the smoothing capacitor for boosting included in the battery converter; V1 denotes the voltage of the smoothing capacitor for boosting included in the battery converter before the battery converter is operated; α and β respectively denote coefficients that are greater than 0 and is not greater than 1; t denotes an elapsed time since a start of the battery converter; tx denotes an elapsed time until the voltage of the smoothing capacitor for boosting included in the battery converter reaches the start-time target voltage Vtar2 after the start of the battery converter; and Paux denotes power consumption during operations of the compressor and the main stop valve.

8. The fuel cell system according to claim 7, wherein the battery sensor has a function of calculating an SOC (State of Charge) of the secondary battery by measuring a voltage and a current of the secondary battery in addition to the function of measuring the temperature of the secondary battery, and the controller is configured to obtain the output limit value of the secondary battery according to a predetermined relationship of the temperature and the SOC of the secondary battery to the output limit value of the secondary battery by using the temperature of the secondary battery and the calculated SOC.

9. The fuel cell system according to claim 6, wherein the battery sensor has a function of calculating an SOC (State of Charge) of the secondary battery by measuring a voltage and a current of the secondary battery in addition to the function of measuring the temperature of the secondary battery, and the controller is configured to obtain the output limit value of the secondary battery according to a predetermined relationship of the temperature and the SOC of the secondary battery to the output limit value of the secondary battery by using the temperature of the secondary battery and the calculated SOC.

10. The fuel cell system according to claim 1, wherein the battery sensor has a function of calculating an SOC (State of Charge) of the secondary battery by measuring a voltage and a current of the secondary battery in addition to the function of measuring the temperature of the secondary battery, and the controller is configured to obtain the output limit value of the secondary battery according to a predetermined relationship of the temperature and the SOC of the secondary battery to the output limit value of the secondary battery by using the temperature of the secondary battery and the calculated SOC.

* * * * *